United States Patent Office 2,699,076
Patented Jan. 11, 1955

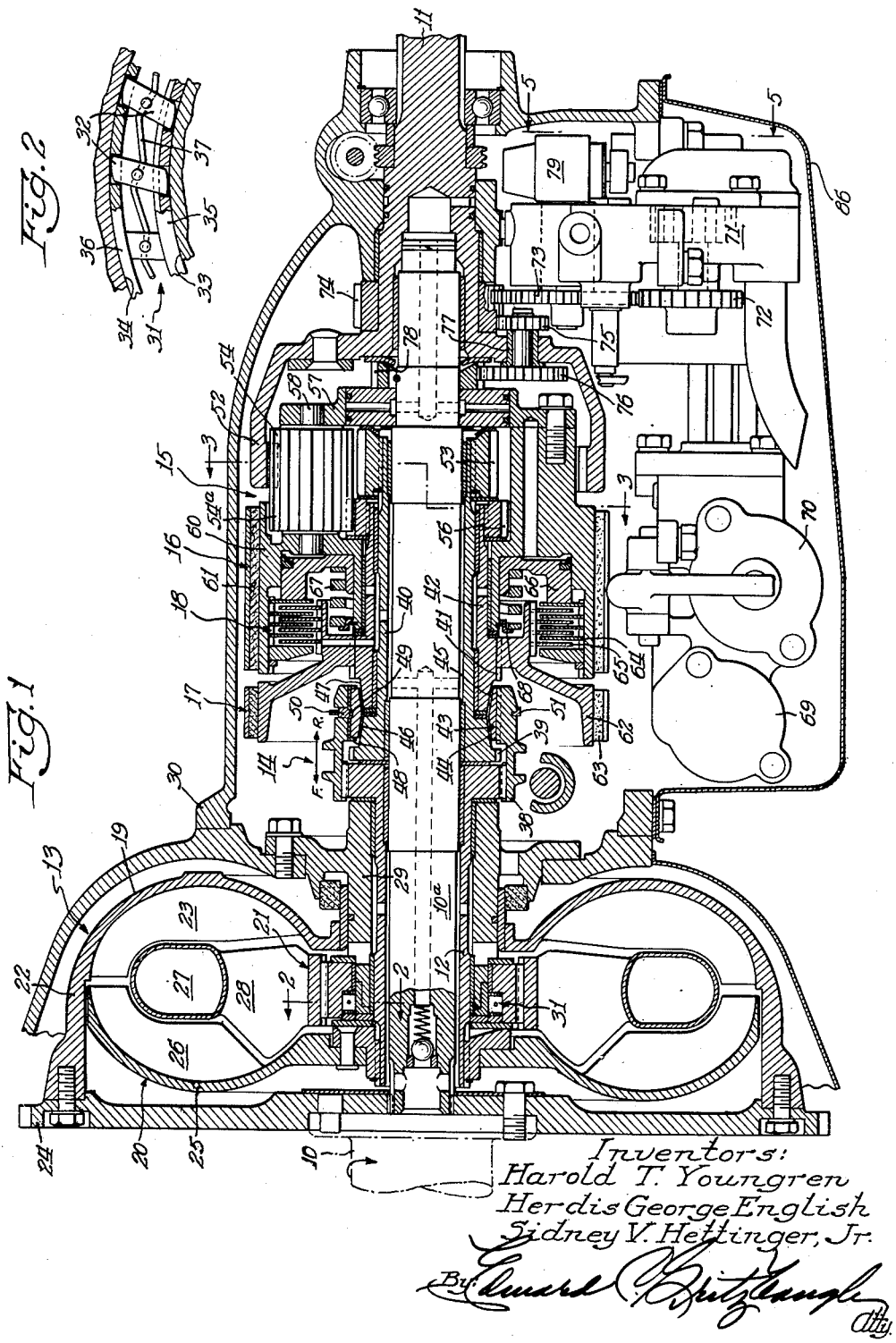

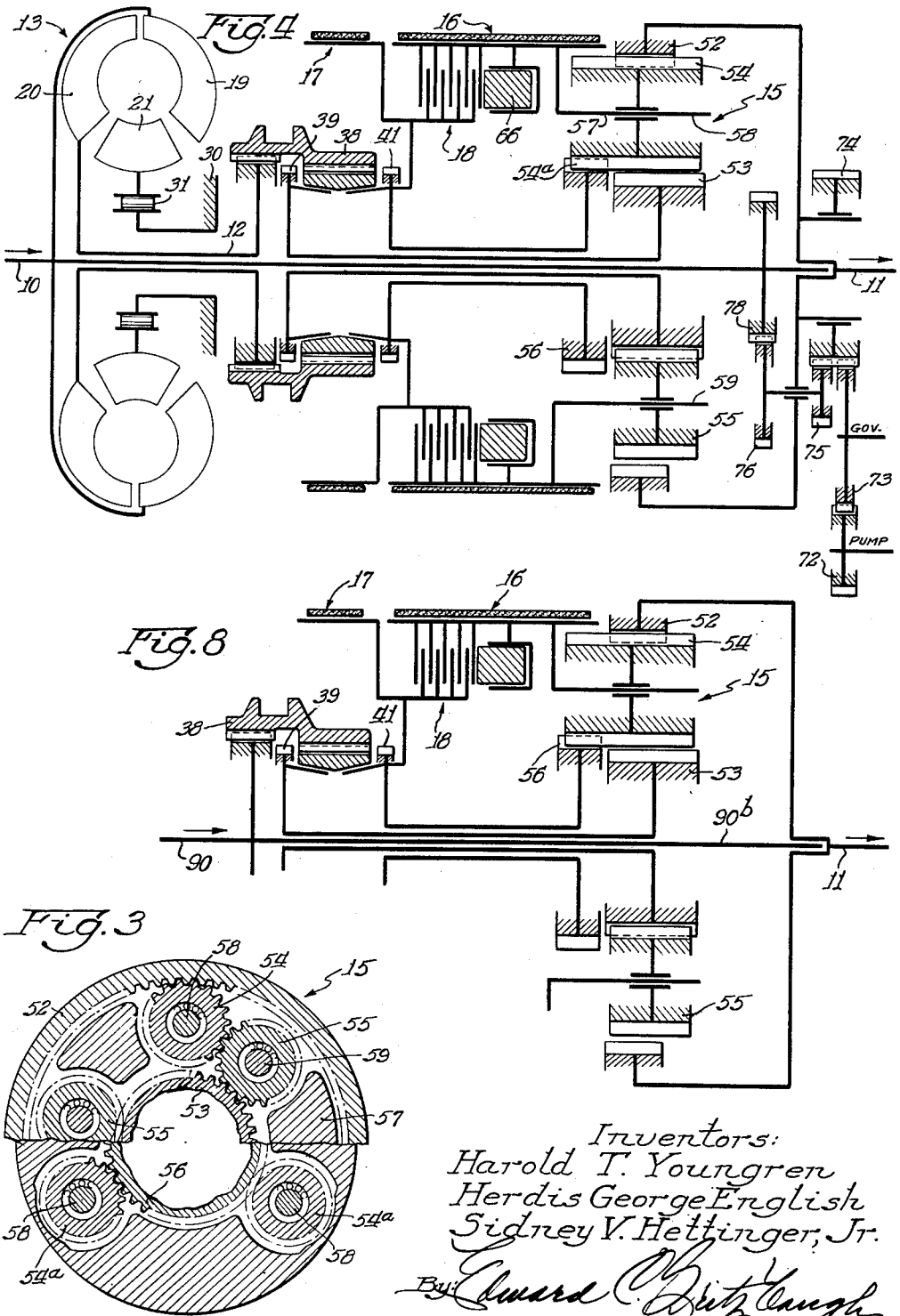

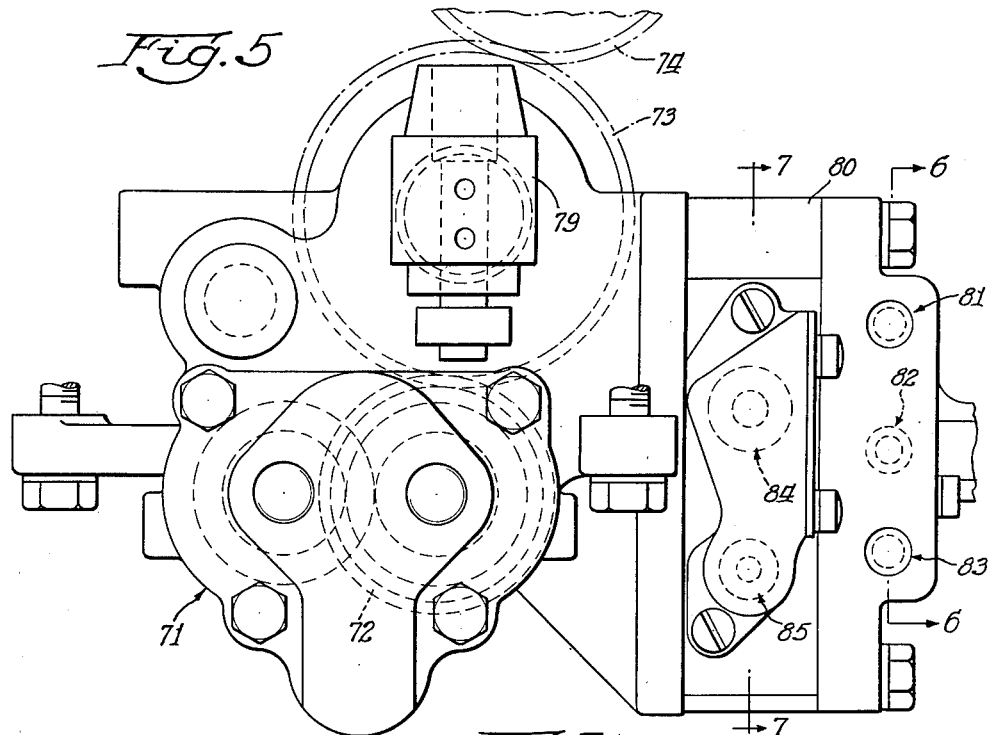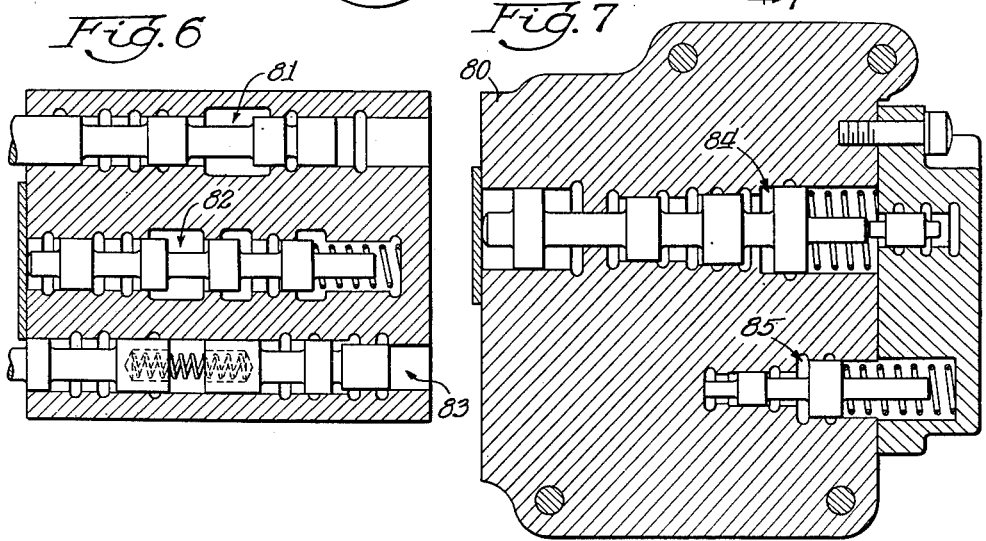

2,699,076

TRANSMISSION

Harold T. Youngren, Birmingham, Mich., and Herdis George English, La Grange, and Sidney V. Hettinger, Jr., Westchester, Ill., assignors to Borg-Warner Corporation, Chicago, Ill., a corporation of Illinois Application May 4, 1948, Serial No. 25,064

2 Claims. (Cl. 74—763)

Our invention relates to transmissions particularly adapted for use in automotive vehicles.

It is an object of the invention to provide an improved transmission which has only three geared forward speeds but nevertheless provides a torque converting range equal to that generally provided by a transmission having four forward geared ratios, with the steps between the ratios not being unduly great for good performance of the vehicle. To this end it is an object of the invention to provide transmission gearing having three geared forward speed ratios connected with a hydraulic torque converter.

It is a further object of the invention to connect the torque converter so that all of the power for all three geared ratios flows through the torque converter whereby a smooth start may be had, and no mechanical vibration dampeners are necessary for a smooth drive. It is also an object to so arrange the gear set connected with the fluid torque converter so that the transmission may be power shifted between its various speed ratios. To this end it is an object of the invention to provide an improved planetary gear set which comprises one friction brake for completing power trains in low speed forward and in reverse, a second friction brake for completing an intermediate forward speed power train and a friction clutch for providing a direct drive.

It is another object of the invention to provide a clutch structure for conditioning the transmission for a drive either in forward or reverse, with the arrangement being such that a single friction coupling may be used for completing either the forward or reverse drive after the transmission has once been conditioned for either drive. It is a more specific object to utilize a dual position positive clutch for so conditioning the transmission for forward drive in one of its positions and for conditioning the transmission for a reverse drive in the other of its positions. Such positive clutch structure has a low drag, that is, when disengaged it transmits little or no drive between its engageable elements and thereby easy vehicle engine starting is obtained. It is a more specific object of the invention to provide a transmission in which the forward and reverse drives are conditioned by engagement of jaw clutches and are completed by subsequent engagement of suitable friction engaging means, with the positive clutches being provided with synchronizing means for synchronizing the speeds of the engageable parts of the jaw clutches just prior to their engagement. It is contemplated that the positive conditioning clutches shall preferably be driven by the hydrodynamic device and in this case the synchronizing means function to avoid clash of the positive clutches in conditioning the transmission for forward and reverse, which clash would otherwise occur due to the torque always being transmitted by the hydrodynamic device.

It is a further object to arrange the gear set used in connection with the torque converter so that the gear set utilizes a minimum number of gears and so that a minimum number of control elements for the gear set is necessary.

It is still another object of the invention to provide controls for the transmission on the bottom of the transmission and such controls may include brake operating servomotors, a pump, a governor and a valve assembly. These are the parts that generally require the most servicing in an automatic transmission, and when so located they may be readily removed for servicing.

The invention consists of the novel constructions, arrangements and devices to be hereinafter described and claimed for carrying out the above stated objects, and such other objects, as will appear from the following description of preferred embodiments of the invention, with reference being made to the accompanying drawings in which:

Fig. 1 is a longitudinal sectional view of a transmission embodying the principles of the invention;
Fig. 2 is a sectional view on an enlarged scale taken on line 2—2 of Fig. 1;
Fig. 3 is a sectional view taken on line 3—3 of Fig. 1;
Fig. 4 is a diagrammatic illustration of the transmission shown in Fig. 1;
Fig. 5 is a view on an enlarged scale taken on line 5—5 of Fig. 1;
Fig. 6 and Fig. 7 are sectional views taken respectively on lines 6—6 and 7—7 of Fig. 5; and
Fig. 8 is a diagrammatic illustration of a modification of the invention.

Like characters of reference designate like parts in the several views.

Referring now to Figs. 1 and 2, the transmission illustrated may be seen to comprise a drive shaft 10, a driven shaft 11, and an intermediate quill shaft 12. A hydrodynamic coupling device in the form of a torque converter 13 is provided effectively between the shafts 10 and 12 and a dual position positive clutch 14 is driven by the shaft 12. A planetary gear set 15, comprising friction brakes 16 and 17 and a friction clutch 18, is driven by the clutch 14 and drives the driven shaft 11. The transmission is intended to be useful for automotive vehicles, and the driving shaft 10 is adapted to be connected to the engine (not shown) of the vehicle and the driven shaft 11 is adapted to be connected to the driving road wheels (not shown) for the vehicle through any suitable driving mechanism, such as the ordinary propeller shaft and differential.

The torque converter 13 comprises an impeller 19, a runner 20 and a stator 21. The impeller 19 comprises a fluid casing 22 and impeller blades 23 fixed within the casing. The casing 22 is bolted to a flywheel 24 to which the shaft 10 in turn is bolted as shown. The runner 20 comprises a casing 25 in which runner blades 26 are fixed, and the runner is fixed to the shaft 12 as shown. The stator 21 comprises a core 27 and blades 28, and the stator is rotatably disposed on a hollow sleeve 29 which is fixed with respect to the casing 30 of the transmission. A one-way brake 31 is disposed between the stator and the shaft 29 for allowing rotation of the stator freely in the forward direction, that is, in the same direction as the shaft 10 is driven by the engine of the vehicle, but preventing rotation of the stator in the reverse direction. The one-way brake 31 may be of any standard well-known construction, although a sprag type brake comprising sprags 32 adapted to wedge between opposite cylindrical surfaces 33 and 34 is illustrated. The sprags extend through windows in oppositely disposed sprag carriers 35 and 36, and a garter spring 37 extends through the sprags. The spring is effective to yieldingly wedge the sprags between the surfaces 33 and 34.

The casing 22 forms a container for fluid, such as oil, which constitutes the driving fluid for the converter 13. When the impeller 19 is rotated from the shaft 10 and flywheel 24, momentum is given the fluid, and the fluid drives the runner 20. The stator 21 functions to change the direction of flow of fluid so that the runner 20 is driven at a greater torque than is applied to the shaft 10 and impeller 19. When the speed of the runner 20 increases above a predetermined speed relative to that of the impeller 19, the converter then functions as a simple two-element fluid coupling, and the runner is driven at the same torque as is applied to the impeller. The stator 21 at this time rotates freely forwardly, being allowed this rotation by the one-way brake 31 which releases. The construction of the torque converter is in accordance with well-known principles of such devices and the operation of such converter is also well-known, and hence further details of the construction and operation will not be further set forth here.

The intermediate shaft 12 which is connected with the runner 20 and constitutes the driven shaft of the converter 13 is connected to the positive clutch 14. This clutch comprises a shiftable sleeve 38 splined to the shaft 12 which is engageable with clutch teeth 39 formed on a sleeve shaft 40 and with clutch teeth 41 formed on a sleeve shaft 42. As will be hereinafter described in greater detail, the sleeve 38 when moved to engage with the teeth 39 functions to condition the planetary gear set 15 for forward drive and when moved in the opposite direction to engage with the teeth 41 functions to condition the gear set 15 for reverse drive. A synchronizer ring 43 having tapered surfaces 44 and 45 is disposed within the sleeve 38, and this ring is adapted to cooperate with tapered surfaces 46 and 47 on the shafts 40 and 42 respectively. A plurality of bars 48 are carried by the synchronizer ring 43, and these are provided with indentations 49 which cooperate with poppet pins 50 disposed in suitable openings in the sleeve 38. A circular spring 51 is disposed around the shiftable sleeve 38, and this spring bears against the poppet pins 50 so as to yieldably hold the pins in the indentations 49 in the bars 48.

The synchronizer ring 43, when moved in one direction or the other, due to the action of the pins 50 and spring 51, functions to synchronize either the shaft 40 or the shaft 42 with the shiftable sleeve 38, depending on the direction in which the sleeve 38 is moved. The sleeve 38 may then be brought into engagement either with the teeth 39 or the teeth 41 without clash. When the sleeve 38 is moved to the left as seen in Fig. 1, the surfaces 44 and 46 wedge to synchronize the speeds of the shaft 40 and sleeve 38, this wedging being brought about by the pins 50 carried by the sleeve 38 which are initially within the indentations 49 in the bars 48 and which thereby forcefully move the ring 43 into contact with the surface 46. After such synchronization of the parts 38 and 40, further movement of the sleeve to the left to engage with the teeth 39 causes the pins 50 to move outwardly against the action of the spring 51 since the synchronizer ring 43 cannot move any further in this direction. The action of the synchronizer ring 43 in synchronizing the shaft 42 and sleeve 38 is the same in principle as when the sleeve 38 is shifted in the forward direction as just described.

The planetary gear set 15 comprises a ring gear 52, a sun gear 53, planet gears 54 in mesh with the ring gear, and planet gears 55 in mesh with the planet gears 54 and with the sun gear 53. The planet gears 54 are elongated pinions having gear portions 54a, and a sun gear 56 is in mesh with the gear portions 54a. The planet gears 54 and 55 are carried by a planet gear carrier 57 respectively by means of shafts 58 and 59 in the carrier.

The ring gear 52 is connected to the driven shaft 11 of the transmission; the sun gear 53 is splined on the shaft 40, and the sun gear 56 is splined on the shaft 42 as shown. The planet gear carrier 57 is rotatably disposed with respect to the shafts 40, 42, and 10. It will be noted that the shaft 10 has an extension 10a extending through the transmission to the driven shaft 11, and this extension is piloted in the driven shaft, and the carrier 57 is rotatably mounted on this extension.

The planet gear carrier 57 is braked by means of the brake 16, and the brake 16 comprises a drum 60 formed on the carrier and a friction band 61 wrapped around the drum. The brake 16 is for completing forward and reverse drive power trains as is described hereinafter in greater detail, and the band 61 is simply engaged with the drum in order to engage the brake 16. The band 61 is so anchored with respect to the casing 30 of the transmission that the band takes a reaction in either direction, as the reactions for forward and reverse drive are in opposite directions. The brake 17 is provided for braking the shaft 42 and thereby the sun gear 56, and this brake comprises a drum 62 splined on the shaft 42 and a friction band 63 adapted to engage the drum 62.

The clutch 18 is provided between the drums 60 and 62 and comprises friction discs 64 splined in the drum 60 and friction discs 65 splined to the drum 62. A piston 66 is provided for engaging the clutch 18, and this piston is disposed in a suitable cavity within the drum 60. A spring 67 is disposed between a washer 68 fixed with respect to the carrier 57, and the piston, and this spring functions to yieldably hold the piston 66 in its clutch disengaging position in which it is shown. The piston 66 may be moved to the left as shown in Fig. 1 to engage the clutch 18 by applying fluid at the back of the piston so that it moves against the action of the spring 67.

Suitable fluid pressure servo motors 69 and 70 may be provided for engaging the friction brake bands 63 and 61 respectively. The motors 69 and 70 may be of any suitable construction, and any suitable power transmitting connections may be provided between the motors and the friction bands 63 and 61.

A pump 71 is adapted to be driven by mechanism connected with both the drive shaft 10 and the driven shaft 11. The pump has a drive gear 72, and this drive gear is connected by means of an idler gear 73 with a gear 74 which is rotatably disposed on the driven shaft 11. The gear 74 is in mesh with a gear 75 which is connected with a gear 76. As will be noted, the gears 75 and 76 are rotatably carried along with the ring gear 52, being rotatably disposed in the ring gear by means of a bushing 77. The gear 76 is in mesh with a gear 78 fixed with respect to the drive shaft extension 10a. The transmission may also be provided with a governor 79 of any suitable construction which together with the pump may be used for suitably controlling the transmission, and the governor is driven by the idler gear 73.

A valve body 80 having valves 81, 82, 83, 84 and 85 is provided adjacent the pump 71 and governor 79 and beneath the shaft 11. The valves are connected by suitable fluid lines (not shown) with the brake operators 69 and 70 and the piston 66 for suitably controlling the brakes 16 and 17 and the clutch 18. The transmission is covered on its bottom with an oil pan 86 bolted to the transmission, and access may be had to the pump governor and valves from the bottom of the transmission by removing the oil pan. These parts are generally those requiring the most service, and it is advantageous to have them accessible from the bottom rather than the side at which there is more interference generally from various vehicle chassis members. The transmission provides low, intermediate, and high speed drives in the forward direction and provides a drive also in the reverse direction. In the condition of the transmission in which it is shown, the transmission is in neutral and although the drive shaft 10 may be driven by the vehicle engine, there is no drive between the shafts 10 and 11.

The transmission may be conditioned for forward drive by moving the clutch sleeve 38 to the left as seen in Fig. 1 into its forward position in which it is engaged with the teeth 39 for thereby coupling together the intermediate shaft 12 and the quill shaft 40. During idling conditions of the vehicle engine, the shaft 12 is driven at idling speeds also, and assuming the vehicle to be stationary, the parts of the planetary gear set 15 as well as the shafts 40 and 42 to which the shaft 12 may be coupled with the coupling 14 are stationary. When the positive clutch sleeve 38 is moved to engage with the teeth 39, the synchronizer ring 43 during such movement and before actual engagement of the sleeve 38 and teeth 39 functions to start rotation of the shaft 40 and to synchronize the speeds of the shafts 12 and 40 with the surfaces 44 and 46 cooperating as is above described. After such synchronization, the sleeve 38 is moved farther to the left as seen in Fig. 1 to engage with the teeth 39, and the transmission is thus conditioned for forward drive. The shaft 40 and the parts 56, 53, 54, 55, and 57 of the gear set 15 are then rotating, being driven by the vehicle engine at idling speed through the converter 13.

Low speed forward drive through the transmission is completed by engagement of the friction brake 16, after the clutch 14 has first been moved into its forward drive position. The brake 16 functions to hold the planet gear carrier 57 stationary, and the drive proceeds from the shaft 40 through the gears 53, 55, 54, and 52 to the driven shaft 11. In low forward speed drive, as in all the other drive ratios provided by the transmission, the torque converter 13 is in the power train, with all of the power transmitted from the drive shaft 10 passing through the torque converter.

The transmission may be shifted from low speed forward drive to second or intermediate speed by engaging the brake 17 and disengaging the brake 16. As will be understood, the planet gear carrier 57 in low speed drive is the reaction member of the gear set, and engagement of the brake 17 to hold the sun gear 56 stationary for second speed drive causes the gear 56 to be the reaction member instead of the carrier. In this speed ratio the drive proceeds through the gear set and in particular through the gears 53, 55, 54, and 52 to the driven shaft 11, in the same manner as in low speed drive, but due to the fact that the sun gear 56 is now stationary, the driven shaft 11 is rotated at a faster speed than in low speed drive. It will, of course, be understood that this transmission may be started in intermediate speed instead of low speed, simply by initially engaging the brake 17 instead of the brake 16.

High speed forward or direct drive is obtained by disengaging the brake 17 and engaging the friction clutch 18. Engagement of the friction clutch locks together the carrier 57 and the sun gear 56 so that the parts of the gear set 15 all rotate as a unit. The shaft 40 is driven from the converter 13 as in the other forward speeds, and with the gear set 15 being locked up, the driven shaft 11 rotates at a one-to-one drive with respect to the shaft 40.

The transmission is conditioned for reverse drive by moving the clutch sleeve 38 to the right as seen in Fig. 1 into engagement with the teeth 41 for thereby coupling the shaft 12 with the shaft 42 and sun gear 56. The synchronizer ring 43 functions similarly as when the transmission is conditioned for forward drive to synchronize the shafts 12 and 42 before the clutch 14 positively connects these shafts. With the positive clutch 14 being in its reverse drive position, the reverse drive power train is completed between the shafts 12 and 11 by engaging the friction brake 16. The planet gear carrier 57 is thus rendered a reaction member and rotation of the sun gear 56 causes a driving of the ring gear 52 and the driven shaft 11 in the reverse direction. The drive is from the gear 56 through the planet gears 54 to the ring gear 52.

The pump 71 may be driven by either of the shafts 10 and 11. When the shaft 11 is stationary, as when the vehicle is stationary, rotation of the shaft 10 and thereby the drive shaft extension 10a by the vehicle engine drives the pump through the gears 76, 75, 74, 73, and 72. The ring gear 57 is stationary, and the gears 75, and 76 rotate only about their own centers and not about the drive shaft extension 10a. Assuming the vehicle engine to be inoperative and the drive shaft 10 stationary, the pump 71 may be driven solely from the driven shaft 11, as by pushing or towing the vehicle. The ring gear 52 is fixed to the shaft 11 and the gears 75 and 76 carried by the ring gear are thereby rotated about the gear 78 fixed to the extension 10a, which is then stationary, so that these gears rotate within their bushing 77. Due to the difference in size of the gears 75 and 76 this rotation of the gears causes the gear 74 to rotate, and the pump gear 72 is thereby rotated through the gear 73. When both the shafts 10 and 11 are rotated, the gear 74 is also rotated to drive the pump 71, as will be apparent from an inspection of the structure. The governor gear 73 is driven along with the gears 74 and 72 and the speeds of these gears vary quite closely with the speed of the driven shaft 11 at the higher ratios and speeds of the transmission.

The illustrated transmission advantageously gives full performance without the necessity of making any critical compromises with present day transmissions even though the gear set provides only three speed ratios when four has generally been conceded to be the minimum, giving sufficiently full performance for the following reasons:

The three forward ratios provided by the gear set in conjunction with the torque converter results in a total ratio coverage equivalent to the usual four speed gear transmission without excessive ratio steps in view of the fact that the torque converter in itself multiplies torque. With this ratio coverage it is possible to utilize axle ratios in the rear end of the vehicle which will give low engine speeds in high speed or cruising gear with resultant savings in operating cost and at the same time have ample performance to meet all normal requirements for acceleration and gradability. The torque converter, in addition to providing additional ratio coverage, also serves to give the ultimate in smooth starting which is an inherent characteristic of fluid torque transmitting devices.

The planetary gear set makes it possible to effect ratio changes without interruption of power, that is, the gear set is power shifted, and this results in smoother operation and higher acceleration. The arrangement provides for continuous driving in all gears through the torque converter, and this provides for maximum smoothness in transmitting torque from the engine to the transmission without the necessity of employing mechanical torsional vibration dampeners or similar devices. At the same time, the arrangement permits maximum possible use of the torque converter.

The first or low gear power train provides sufficient ratio to give adequate engine braking such as is required in descending steep grades. At the same time the use of the low or first gear train makes it possible to tow or push the vehicle to start the engine at reasonable and safe speeds of the vehicle.

Due to the illustrated arrangement of connecting the turbine shaft 12 to the planetary gear set through the positive clutch 14, which when disengaged has inherently very little drag, that is, a tendency of one of the parts to be coupled to rotate the other part, the transmission does not adversely affect starting of the vehicle engine to extremely low temperatures. Although we do not intend to so limit the invention, we contemplate that a torque converter 13, which is a highly efficient unit but has only a stall torque ratio of approximately 2 to 1, may be utilized and with such a unit it is possible and, in fact, it is preferable to make all normal starts in the intermediate gear ratio and shift into third gear ratio or direct drive automatically at the proper vehicle speed, depending on the throttle opening. With this arrangement there is adequate performance for all normal driving using the two top ratios of the transmission, and it is necessary to make only one automatic shift. This permits the use of a relatively simple control system with its obvious advantages.

The differential pump drive, by means of which the pump 71 may be driven by either the drive shaft 10, the driven shaft 11, or both, makes it possible for one pump to supply all control requirements. Because of this single fluid pump, losses are lower and efficiencies are higher.

This transmission represents an important economy in the number of parts, the design and shape of parts and cost of manufacture and assembly of these parts for the following specific reasons:

Only nine gears are used in the power transmitting mechanism, namely, two sun gears, six pinions, and one ring gear, which when assembled provide three forward ratios and one reverse ratio. The control of the planetary gearing to give these ratios is accomplished by two brake bands, one multiple disc clutch which need only have a relatively low torque capacity and one two-way positive clutch. One of the two bands provides for both low and reverse ratios and is double acting in nature, that is, it is adapted to take reaction in either direction.

The employment of a differential pump drive makes possible the use of only one oil pump instead of the usual two in order to provide oil pressure when either engine or transmission output shaft is operating. The selection of proper drive gear ratios for the pump makes it possible to drive the governor from one of the gears in the pump drive gear train, and this eliminates the need for a separate governor drive mechanism.

The use of the two-way positive clutch 14 eliminates the need for two high capacity friction clutches which are both complex and costly as well as bulky. This positive clutch has a neutral condition, and hence there can be no drive from the intermediate shaft 12 driven by the converter 13 to the driven shaft 11. With the brakes 16 and 17 and the clutch 18 being disengaged, there can, of course, be no real drive through the gear set 15; however, the provision of neutral in the clutch 14 assures that even in cold weather when the lubricant in the gear set 15 may be stiff there can be no drive between the shafts 12 and 11 when none is desired.

During idling condition of the vehicle engine, the shaft 12 and thereby the clutch sleeve 38 are also idling, and the provision of the synchronizer ring 43 functions to prevent clashing of the clutch sleeve 38 in engaging with either of the sets of teeth 39 and 41 which are normally stationary when the vehicle is stationary. The synchronizer ring 43 functions to bring the speeds of the teeth 39 and 41 equal to that of the clutch sleeve 38 to thus prevent such clashing. The brakes 16 and 17 and the friction clutch 18 are assumed to be disengaged so that the friction ring 43 need not cause any drive of the driven shaft 11 and the vehicle. After engagement of the positive clutch 14, the forward or reverse power trains may be completed by engaging the friction brake 16, as is above described.

The transmission represents a real advantage from the standpoint of service, due in particular to the positioning of the parts of the control system for ready access. The probability is that a high percentage of the service work required for this transmission will be in connection with the control arrangements of the transmission, and the arrangement was therefore so made that all of these elements are readily accessible by removal of the oil pan. This eliminates the need for removing vehicle floor covers and transmission side covers to gain access to the part requiring service. The various parts, hydraulic governor, oil pump, valve body and servo motors may be readily removed from the underside of the transmission for testing individually or as a group and repairs made accordingly.

The embodiment of the invention shown in Fig. 8 is similar to the Fig. 1 embodiment except that the torque converter 13 and the pump 71 and governor 79 and the driving mechanism for these parts have been left out. The shaft 90 is the driving shaft of the transmission and has an extension 90b which is piloted in the driven shaft 11. The shaft 90 corresponds to the shaft 12 in the first embodiment of the invention, as will be noted from an examination of these two forms. The Fig. 8 embodiment operates and is controlled in the same manner as are the correspondingly numbered parts in the first embodiment and illustrates in particular that the gear set of the first embodiment may be useful without the torque converter 13 with which it is connected.

It is to be understood that the invention is not to be limited to the specific structures, arrangements, and devices hereinabove described except only insofar as the claims may be so limited, as it will be apparent to those skilled in the art that changes may be made without departing from the principles of the invention. In the construction of the appended claims, we wish it to be understood that an engaging means or the like specified in the claims is intended to include either a clutch or a brake.

We claim:
1. In a transmission, the combination of a drive shaft, a driven shaft, means for providing low, intermediate and high speed forward drives and a reverse drive between said shafts and including a planetary gear set, said gear set comprising a ring gear, a planet gear in mesh with the ring gear, a sun gear, a second planet gear in mesh with said first-named planet gear and with said sun gear, a second sun gear in mesh with a portion of said first planet gear, and a carrier for said planet gears, means connecting said ring gear and said driven shaft, a positive clutch having two engaged positions for connecting either of said sun gears with said drive shaft and conditioning the transmission for a drive in forward in its engaged condition connecting said first-named sun gear with said drive shaft and for a drive in reverse in its engaged position connecting the other of said sun gears with said drive shaft, a friction brake for said carrier for completing either the low speed forward or the reverse drive power train when engaged, a brake for said second-named sun gear for completing said intermediate speed forward drive, a clutch for locking together said carrier and said second-named sun gear for providing said forward high speed drive and means for synchronizing the engaging parts of said positive clutch prior to engagement.

2. In a transmission, the combination of a drive shaft, a driven shaft, means for providing low, intermediate and high speed forward drives and a reverse drive between said shafts and including a planetary gear set, said gear set comprising a ring gear, a planet gear in mesh with the ring gear, a sun gear, a second planet gear in mesh with said first-named planet gear and with said sun gear, a second sun gear larger in size than said first-named sun gear and in mesh with a portion of said first-named planet gear, and a carrier for said planet gears, means connecting said ring gear and said driven shaft, clutch means for connecting said first-named sun gear with said drive shaft to condition the transmission for its forward drives and clutch means for connecting said second sun gear with said drive shaft for conditioning the transmission for its reverse drive, a friction brake for said carrier for completing either the low speed forward or the reverse drive when engaged, and a friction brake for said second-named sun gear for completing said intermediate speed forward drive.

References Cited in the file of this patent

UNITED STATES PATENTS

| | | |
|---|---|---|
| 2,005,726 | Banker | June 25, 1935 |
| 2,132,728 | Ford | Oct. 11, 1938 |
| 2,134,398 | Cotterman | Oct. 25, 1938 |
| 2,193,304 | Thompson | Mar. 12, 1940 |
| 2,194,823 | Dooley | Mar. 26, 1940 |
| 2,220,174 | Ravigneaux | Nov. 5, 1940 |
| 2,221,393 | Carnegie | Nov. 12, 1940 |
| 2,289,871 | Bieretz | July 14, 1942 |
| 2,308,547 | Schneider | Jan. 19, 1943 |
| 2,324,713 | McFarland | July 20, 1943 |
| 2,372,817 | Dodge | Apr. 3, 1945 |
| 2,408,951 | Pollard | Oct. 8, 1946 |
| 2,421,190 | Dodge | May 27, 1947 |
| 2,430,799 | Aspinwall | Nov. 11, 1947 |
| 2,605,652 | Kehlel | Aug. 5, 1952 |

FOREIGN PATENTS

| | | |
|---|---|---|
| 372,382 | Great Britain | May 3, 1932 |
| 48,019 | France | Oct. 16, 1937 |
| | (Addition to No. 809,102) | |
| 809,102 | France | Feb. 24, 1937 |
| 929,571 | France | Dec. 31, 1947 |